United States Patent [19]

Kobayashi et al.

[11] 4,215,542
[45] Aug. 5, 1980

[54] EXHAUST GAS PURIFYING APPARATUS FOR AUTOMOBILE MULTI-CYLINDER ENGINE

[75] Inventors: Kazuo Kobayashi; Tatsuro Oda; Tadataka Nakazumi; Kazuyuki Tanaka, all of Hiroshima, Japan

[73] Assignee: Toyo Kogyo Co., Ltd., Hiroshima, Japan

[21] Appl. No.: 933,041

[22] Filed: Aug. 11, 1978

[30] Foreign Application Priority Data

Aug. 18, 1977 [JP] Japan .................. 52-110855[U]

[51] Int. Cl.² ...................... F01N 3/15; F01N 3/10
[52] U.S. Cl. ........................... 60/290; 60/293; 60/294; 60/301
[58] Field of Search ............ 60/293, 284, 288, 299, 60/274, 294, 301, 290

[56] References Cited

U.S. PATENT DOCUMENTS

| | | | |
|---|---|---|---|
| 3,767,764 | 10/1973 | Dolbear | 60/301 |
| 3,791,144 | 2/1974 | Lang | 60/301 |
| 3,906,722 | 9/1975 | Garcea | 60/293 |
| 3,984,975 | 10/1976 | Price | 60/284 |
| 4,077,208 | 3/1978 | Sawada | 60/294 |
| 4,165,611 | 8/1979 | Ishikawa | 60/293 |

*Primary Examiner*—Douglas Hart
*Attorney, Agent, or Firm*—Wenderoth, Lind & Ponack

[57] ABSTRACT

An exhuast gas purifying apparatus for use in an automobile multi-cylinder engine of the type which has exhaust ports communicating with engine cylinders and through which exhaust gases are emitted subsequent to combustion of an air-fuel mixture. The exhaust gas purifying apparatus comprising a reducing catalyst unit and a three-way catalyst unit which are disposed in a main exhaust manifold which is connected at one end to a first group of the exhaust ports and at the other end to the atmosphere, and an auxiliary exhaust manifold connected at one end to a second group of the exhaust ports and at the other end to a portion of the main exhaust manifold at a location downstream of the reducing catalyst unit and upstream from the three-way catalyst unit. A pressure operated valve is disposed in a secondary air supply passage for introducing a secondary air into the auxiliary exhaust manifold by the utilization of the pulsating flow of the exhaust gases through the auxiliary exhaust manifold. This secondary air supply passage also has a control valve for regulating the flow of the secondary air therethrough during the opening of the pressure operated valve.

8 Claims, 4 Drawing Figures

EXHAUST GAS PURIFYING APPARATUS FOR AUTOMOBILE MULTI-CYLINDER ENGINE

BACKGROUND OF THE INVENTION

The present invention generally relates to an exhaust gas purifying apparatus and, more particularly, to a dual-catalyst exhaust gas purifying apparatus for an automotive vehicle engine of the type which has a plurality of engine cylinders.

The copending U.S. patent application Ser. No. 891,111, filed on Mar. 28, 1978, in which two of the inventors of the present invention are involved and which is assigned to the same assignee of the present invention, discloses a dual-catalyst purifying apparatus of the kind to which the present invention pertains. According to this copending U.S. application, a plurality of engine cylinders are divided into first and second groups, the exhaust ports of the engine cylinders of the first group are connected to a main exhaust manifold which has reducing and oxidizing catalyst units disposed therein while the exhaust port of the engine cylinder of the second group is connected to a portion of the main exhaust manifold between the reducing and oxidizing catalyst units through an auxiliary exhaust manifold.

For supplying a secondary air which is necessary to enhance oxidization of the exhaust gases during the passage of the exhaust gases through the oxidizing catalyst unit, a portion of the auxiliary exhaust manifold is connected to a source of secondary air through a pressure operated valve which, in this case, is a reed valve.

The dual-catalyst purifying apparatus disclosed in the copending U.S. patent application is designed so that, since there is no substantial resistance to flow of the exhaust gases in the auxiliary exhaust manifold, the exhaust gases which are successively emitted from the engine cylinder of the second group at intervals which are determined by the timing of successive firing of the air-fuel mixture within the engine cylinders, flow through the auxiliary exhaust manifold in a pulsating manner with the pressure alternately increasing and decreasing so that this pulsating flow of the exhaust gases through the auxiliary exhaust manifold can be utilized to repeatedly open and close the reed valve.

The above numbered copending U.S. application also discloses the possibility of using a three-way catalyst as a catalyst which is contained in the oxidizing catalyst unit.

The dual-catalyst purifying apparatus disclosed in the copending U.S. application is satisfactory in that an engine driven pump, which has heretofore been required to supply the secondary air and which has heretofore been considered to be a cause of reduction of the engine power output, is not required because of the utilization of the pulsating flow of the exhaust gases through the auxiliary exhaust manifold. However, it has been found that, since the amount of the secondary air to be supplied into the auxiliary exhaust manifold is determined by the pulsating characteristics of flow of the exhaust gases through the auxiliary exhaust manifold, the amount of secondary air to be supplied into the auxiliary exhaust manifold tends to increase during low speed and/or low load operating conditions of the engine while it tends to decrease during high speed and/or high load operating conditions of the engine. This results in complications such the three-way catalyst cannot be utilized in the presence of a three-way atmosphere, or more specifically, an atmosphere which is intermediately between the oxidizing atmosphere and the reducing atmosphere, throughout any one of various engine operating conditions and, therefore, an insufficient removal of nitrogen monoxides which are contained in the exhaust gases is achieved.

More specifically, as shown in the graph of FIG. 1, the ratio of the secondary air to be supplied into the auxiliary exhaust manifold relative to the amount of the exhaust gases emitted, which is expressed in terms of percentage, tends to decrease, as shown by the solid line, as the opening of the throttle valve, which is expressed in terms of degree, increases as shown by the broken line, or as the negative pressure within the intake manifold connected to the engine cylinders decreases as shown by the chain line, or as the speed of the engine increases. In other words, as the load imposed on the engine or the speed of the engine increases, the ratio of the secondary air to be supplied into the auxiliary exhaust manifold relative to the amount of the exhaust gases emitted, decreases.

Accordingly, in the dual-catalyst purifying apparatus disclosed in the above numbered copending U.S. application, if the amount of the secondary air to be supplied into the auxiliary exhaust manifold is selected so as to render the exhaust gases emitted from all of the engine cylinders to be of the three-way atmosphere type during low speed or low load operating condition of the engine, the amount of secondary air to be supplied into the same auxiliary exhaust manifold during the high speed or high load operating condition of the engine would be short of the required amount and, therefore, the exhaust gases emitted from all of the engine cylinders and ready to pass through the three-way catalyst unit tend to be of a reducing atmosphere type. This results in that, even though the nitrogen monoxides can be removed, the carbon monoxides and hydrocarbons can not sufficiently be removed from the exhaust gases.

On the other hand, if the amount of the secondary air to be supplied into the auxiliary exhaust manifold is selected so as to render the exhaust gases emitted from all of the engine cylinders during the high speed or high load operating condition of the engine to be of the three-way atmosphere type, the amount of the secondary air to be supplied into the same auxiliary exhaust manifold during low speed or low load operating conditions of the engine would become excessive and, therefore, the exhaust gases emitted from all of the engine cylinders which are ready to pass through the three-way catalyst unit tend to be of an oxidizing atmosphere type. This results in that, even though the carbon monoxides and hydrocarbons can be removed, the nitrogen monoxides cannot sufficiently be removed from the exhaust gases.

SUMMARY OF THE INVENTION

The present invention has as an object to provide an improved dual-catalyst exhaust gas purifying apparatus which does not have the disadvantages and inconveniences which result from the prior art as shown in the similar type apparatus disclosed in the above described copending U.S. application.

Another important object of the present invention is to provide an improved dual-catalyst exhaust gas purifying apparatus of the type referred to above, which is effective for substantially eliminating noxious components of the exhaust gases during any one of the various engine operating conditions.

A further object of the present invention is to provide an improved dual-catalyst exhaust gas purifying apparatus of the type described above which does not require expensive and power-consuming pumping means such as is employed in the prior art apparatus of a similar kind.

In accomplishing these and other objects of the present invention, a plurality of exhaust ports which respectively communicate with engine cylinders, are divided into first and second groups, the exhaust ports of the first group being connected to a main exhaust manifold which has reducing and three-way catalyst units disposed therein while the exhaust port or ports of the second group are connected to a portion of the main exhaust manifold between the reducing and three-way catalyst units through an auxiliary exhaust manifold. Since the concept of the present invention can be equally applicable to an automotive vehicle engine having two or more engine cylinders, the number of exhaust ports of each group may be one or more, however, the number of exhaust ports of the first group has to be equal to or greater than half the total number of the exhaust ports of the engine.

For supplying a secondary air necessary to render the exhaust gases, which have been emitted from all of the exhaust ports of the engine cylinders and are ready to pass through the three-way catalyst unit, to be of a three-way atmosphere type, a part of the auxiliary exhaust manifold is connected to a source of secondary air through a pressure operated valve which is a reed valve.

In accordance with the present invention, a secondary air supply passage extending between the secondary air source and the auxiliary exhaust manifold and having the pressure operated valve disposed therein includes a control valve positioned upstream of the pressure operated valve with reference to the direction of flow of the secondary air from the secondary air source towards the auxiliary exhaust manifold. This control valve is operable in response to a change in the magnitude of the engine operating parameters which include the speed of the engine and the load imposed on the engine. In particular, the opening of this control valve increases with an increase of the magnitude of the engine operating parameters to thereby increase the amount of the secondary air to be supplied into the auxiliary exhaust manifold during the opening of the pressure operated valve on one hand and decreases with a decrease in magnitude of the engine operating parameters to thereby decrease the amount of the secondary air to be supplied into the auxiliary exhaust manifold during the opening of the pressure operated valve on the other hand.

In practice, the control valve is designed so that the amount of the secondary air to be supplied into the auxiliary exhaust manifold during a high speed or high load operating condition of the engine is of a value which is required to render the exhaust gases, which have been emitted from all of the exhaust ports of the engine cylinders and are ready to pass through the three-way catalyst unit, to be of a three-way atmosphere. By so doing, when the engine is driven at a low speed or under a low load, that is, during a low speed or low load operating condition of the engine, the control valve is automatically adjusted to decrease the amount of secondary air to be supplied into the auxiliary exhaust manifold to render the ratio of the amount of the secondary air to be supplied into the auxiliary exhaust manifold relative to the amount of the exhaust gases emitted to be of a proper value such that, even during the low speed or low load operating condition of the engine, the exhaust gases which have been emitted from all of the exhaust ports of the engine cylinders and are ready to pass through the three-way catalyst unit, are of the three-way type atmosphere. In other words, with the control valve so installed in accordance with the present invention, the ratio referred to above can be maintained at a predetermined proper value throughout any one of the various engine operating conditions.

For operating the control valve, the latter may be operatively coupled to one or a combination of the throttle valve, the engine power output shaft and the negative pressure developed in the intake manifold downstream of the throttle valve. In one preferred embodiment, however, the control valve is operatively coupled to the throttle valve such that an increase and decrease of the opening of the throttle valve correspond to an increase and decrease of the opening of the control valve. In another preferred embodiment, the control valve is operatively coupled to the engine power output shaft by way of a governor such that an increase and decrease of the speed of the engine correspond to an increase and decrease in the opening of the control valve.

As is the case with the apparatus disclosed in the above numbered copending U.S. application, the flow of the secondary air from the secondary air source towards the auxiliary exhaust manifold through the pressure operated valve during the opening of the control valve is effected by the utilization of a pulsating flow of the exhaust gases which are successively emitted from the exhaust port or ports of the second group at intervals. As is well known to those skilled in the art, the exhaust gases are successively emitted from the respective engine cylinders one at a time and at intervals determined by the timing of firing of the air-fuel mixture in each of the engine cylinders. Therefore, considering the continued operation of the engine for a substantial length of time, any one of the engine cylinders emits the exhaust gases in a substantially pulsating manner with the pressure alternately increasing and decreasing. This pulsating flow of the exhaust gases is utilized in opening and closing the pressure operated valve, that is, the reed valve. This arrangement is advantageous in that no engine driven pumping means, which has heretofore been required in the prior art apparatus of a similar kind, is required in the present invention and, therefore, the present invention does not include any of the problems associated with a reduction in engine power output. Moreover, since no complicated engine operated pumping means is necessary, the apparatus according to the present invention can be manufactured at a reasonably low cost.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
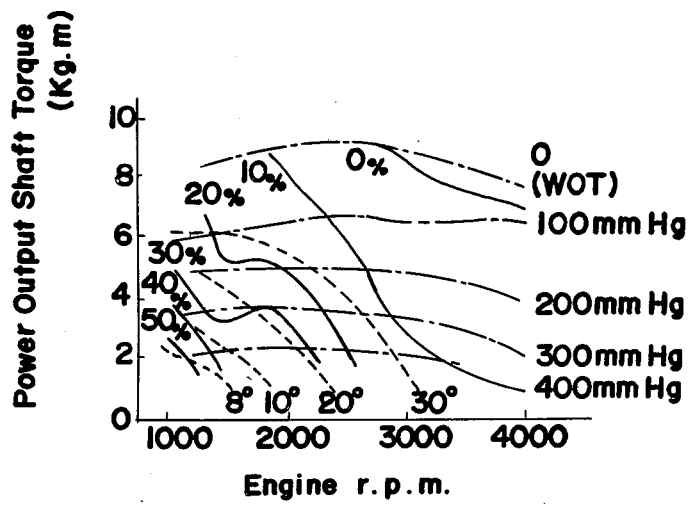
FIG. 1 is a graph illustrating the operating characteristics of an exhaust gas purifying apparatus of the present invention and that of the prior art apparatus, wherein the ratio (expressed by percentage) of the amount of a secondary air supplied relative to the amount of exhaust gases emitted, the opening of the throttle valve and the amount of intake manifold negative pressure (mmHg) are given as the respective parameters.

Before the description of the present invention proceeds, it is to be noted that like parts are designated by like reference numerals throughout the accompanying drawings.

Figure 2:
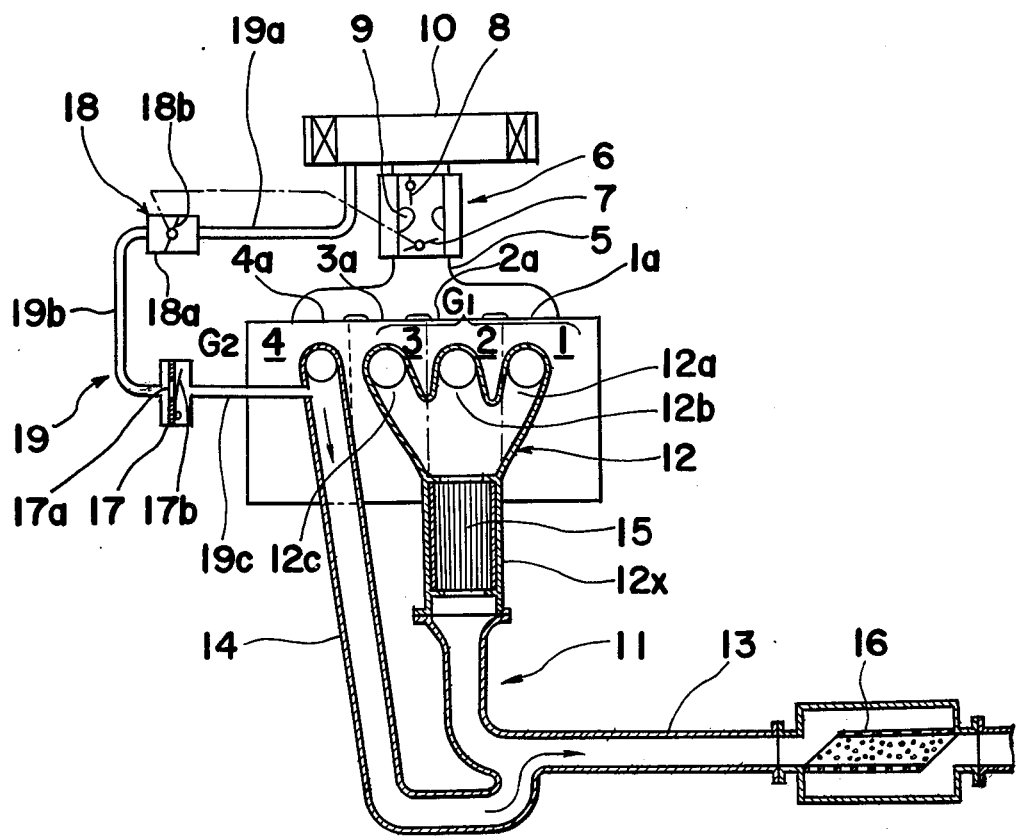
FIG. 2 is a schematic side sectional view of a four-cylinder engine according to a first preferred embodiment of the present invention.

Referring first to FIG. 2, there is shown an automobile internal combustion engine E of any known construction having, for example, four engine cylinders 1, 2, 3 and 4 all having respective intake ports (not shown) communicating through intake ducts 1a, 2a, 3a and 4a to an intake manifold 5. The intake manifold 5 includes a carburetor 6 disposed thereon, said carburetor 6 including a throttle valve 7, a choke valve 8 and a venturi area 9 and serving as a source of air-fuel mixture where a fresh air and a fuel respectively supplied from the atmosphere through an air cleaner 10 and a fuel tank (not shown) are mixed in a predetermined ratio which is substantially equal to or appreciably richer than the stoichometric air-to-fuel ratio in any known manner.

The engine cylinders 1, 2, 3 and 4 also have respective exhaust ports which, for the purpose of description of the present invention, are divided into two groups G1 and G2. The number of the exhaust ports of the first group G1 should be equal to or greater than half the total number of the engine cylinders. However, in the Figure as shown, the first group G is made up of by three exhaust ports of the engine cylinders 1, 2 and 3 while the second group G2 is made up of the remaining exhaust port of the engine cylinder 4.

The exhaust ports of the first group G1 are connected to a main exhaust manifold means 11 including a collecting duct means 12 and an exhaust passage 13, the collecting duct means 12 being made up of a tubular body 12x and exhaust ducts 12a, 12b and 12c which are branch outwardly off from one end of the tubular body 12x and are connected respectively to the exhaust ports of the engine cylinders 1, 2 and 3 of the first group G1. The exhaust port of the engine cylinder 4 of the second group G2 is connected to the exhaust passage 13 through an auxiliary exhaust manifold means 14.

As illustrated, the air-fuel mixture proportioned to a mixture ratio appreciably richer than the stoichiometric air-to-fuel mixture ratio is supplied equally into the individual engine cylinders 1, 2, 3 and 4 and, therefore, the exhaust gases subsequently exhausted from the respective engine cylinders 1 to 4 are similar in quality or nature to each other. This is particularly advantageous in that the engine intake system can be simplified requiring only one carburetor 6 as shown. However, it is preferred that only the air-fuel mixture to be introduced into the engine cylinders 1, 2 and 3 which are associated with the exhaust ports of the first group G1 may be proportioned to a mixture ratio such that the exhaust gases subsequently emerging from the respective engine cylinders 1, 2 and 3 are of a nature ready to be reduced in the presence of a reducing catalyst while the air-fuel mixture to be introduced into the engine cylinder 4 associated with the exhaust port of the second group G2 may be of a mixture ratio equal to or different from that of the air-fuel mixture to be supplied into the engine cylinders 1, 2 and 3, although this requires the use of two carburetors in the intake system.

Within the tubular body 12x of the collecting duct means 12, there is installed a reducing catalyst unit 15 which contains any one of a known three-way catalyst and a catalyst of a type which is capable of performing a reducing function, when used in the reducing atmosphere, and also an oxidizing function when used in the oxidizing atmosphere. The catalyst employed in the catalyst unit 15 may be of either a pellet type or a monolithic type. It is to be noted that the catalyst unit 15 is installed within the tubular body 12x so that the entire amount of the exhaust gases emitted from the exhaust ports of the first group G1 can flow therethrough towards the exhaust passage 13.

The main exhaust manifold means 11 includes, in addition to the reducing catalyst unit 15, a three-way catalyst unit 16 which contains a three-way catalyst therein. Even the catalyst employed in the catalyst unit 16 can be either a pellet type or a monolithic type. The catalyst unit 16 is installed in the exhaust passage 13 at a position which is subsequently described.

While the exhaust manifold means has the catalyst units 15 and 16 installed as hereinbefore described, one end of the auxiliary exhaust manifold means 14 which is remotely located from the exhaust port of the second group G2 is connected to the exhaust passage 13 at a position substantially intermediate between the catalyst units 15 and 16.

The dual-catalyst purifying apparatus of the present invention further comprises a secondary air supply passage means 19 made up of by an upstream passage 19a extending from the air cleaner 10, an intermediate passage 19b and a downstream passage 19c connected to the auxiliary passage means 14. The secondary air supply passage means 19 includes a check valve 17, which is a reed valve disposed at the junction between the intermediate and downstream passages 19b and 19c, and a control valve 18 which is a flow regulating valve and disposed at the junction between the upstream and intermediate passages 19a and 19b. The secondary air supply passage means 19 made up of the upstream, intermediate and downstream passages 19a to 19c can introduce a fresh air, that is, a secondary air, into the auxiliary exhaust manifold means 14 through the control valve 18 and then through the reed valve 17. The reed valve 17 has an aperture 17a and a reed member 17b adapted to open and close the aperture 17a is located so that, when a negative pressure and a positive pressure are alternately developed in the auxiliary exhaust manifold means 14 during the pulsating flow of the exhaust gases therethrough, the reed member 17b is correspondingly alternately displaced to open and close the aperture 17a to allow and interrupt, respectively, the supply of the secondary air from the passage 19b onto the passage 19c. It is to be noted that, during the condition in which the reed member 17b is held in position to close the aperture 17a because of the positive pressure present within the auxiliary exhaust manifold means 14, no exhaust gases flow from the passage 19c into the passage 19b and, in other words, the reed valve 17 operates as a sort of check valve.

In the construction so far described, it is clear that the exhaust gases exhausted from the engine cylinders 1, 2 and 3 are collected together as they enter the collecting duct means 12 and then flow towards the atmosphere through the reducing catalyst unit 15 within the tubular body 12x and then through the three-way catalyst unit 16 in the exhaust passage 13. As hereinbefore described, as the exhaust gases flow through the reducing catalyst unit 15, nitrogen oxides which are contained in the exhaust gases are reduced and, as the exhaust gases are subsequently passed through the three-way catalyst unit 16, carbon monoxides and hydrocarbons which are still present in the exhaust gases are oxidized. On the other hand, since there is no resistance to the flow of the exhaust gases being exhausted from the engine cylinder 4 into the auxiliary exhaust manifold means 14, the secondary air can be sucked into the exhaust manifold means 14 by utilizing the pulsating flow of the exhaust gases in the auxiliary exhaust manifold means 14 as hereinbefore described without the pulsating characteristic of flow of such exhaust gases being weakened.

Figure 4:
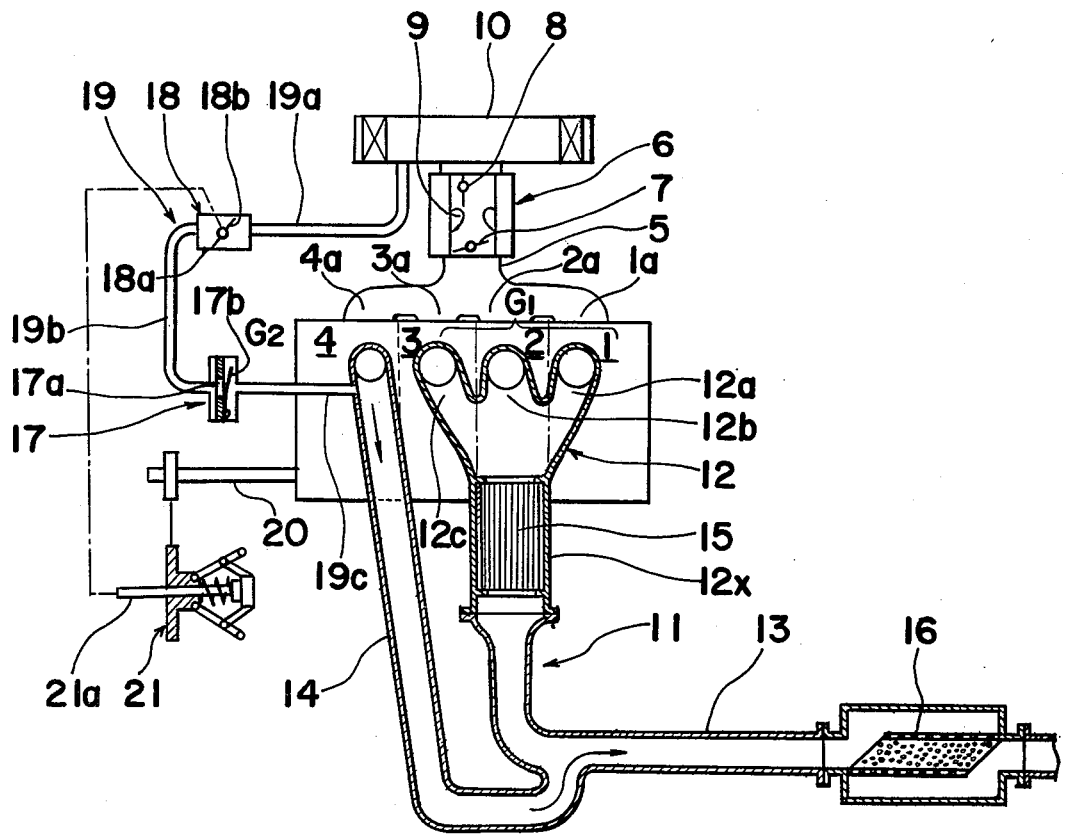
FIG. 4 is a view similar to FIG. 2, showing another preferred embodiment of the present invention.

The control valve 18 can be of a type comprising a barrel 18a, having its opposite ends connected respectively to the upstream and intermediate passages 19a and 19b, and a valve member 18b pivotally supported within the barrel 18a for movement between closed and opened positions. This control valve 18 is operable to regulate the rate of flow of the secondary air during the opening of the reed valve 17 from the upstream passage 19a onto the intermediate passage 19b in response to change in the magnitude of an operating parameters of the engine E, said parameter including a load which is imposed on the engine and which is generally represented by the opening of the throttle valve 17, and the number of revolutions of the engine E. So far illustrated, the control valve 18 is operatively linked to the throttle valve 7 by means of any known link mechanism such that the opening of the control valve 18 increases with an increase of the opening of the throttle valve 7, and vice versa.

Where the control valve 18 is desired to regulate the rate of flow of the secondary air in response to change in speed of the engine E, it can be operatively connected to an engine output shaft 20 through any conventional governor 21 as shown in FIG. 4. In the arrangement shown in FIG. 4, it can readily be seen that, as the speed of the engine E increases, the governor shaft 21a of the governor 21 moves towards the left, as viewed in FIG. 4, the movement of the governor shaft 21a is transmitted to the control valve 18 in any known manner such that the increase of the speed of the engine E results in an increase of the opening of the control valve 18.

In the construction described above, it is clear that, since the total amount of the secondary air to be supplied into the auxiliary exhaust manifold means 14 during the opening of the reed valve 17 is completely restricted by the opening of the control valve 18 which is located within the secondary air supply passage means 19 and is operating to regulate the flow of the secondary air therethrough in accordance with the speed of the engine E or the load on the engine E, the ratio of the secondary air to be supplied into the auxiliary exhaust manifold means 14 relative to the amount of exhaust gases emitted (hereinafter referred to as a secondary air supply ratio) is always adjusted to a specified value and the purifying efficiency is greatly improved in comparison with that of the conventional apparatus of the type described above. With the secondary air supply passage means 19 including the reed valve 17 and the control valve 18, when the engine is driven at a low speed thus resulting in a relatively low number of revolutions or under a relatively small load and the opening of the throttle valve 7 in the intake manifold means 5 is therefore small, the total or absolute amount of the secondary air to be passed through the air supply passage means 19 is lowered to a minimum amount by the control valve 18 of which opening depends upon the opening of the throttle valve. Therefore, although the reed valve 17 is alternately closed and opened by the pulsating flow of the exhaust gases passing through the auxiliary exhaust manifold means 14 during conditions in which the speed of the engine E or the load on the engine E is relatively small, that is, during the low speed or low load operating condition of the engine E, the total or absolute amount of secondary air being supplied into the auxiliary exhaust manifold means 14 through the reed valve 17 is limited to the minimum value by the operation of the control valve 18. In contrast, when the engine is driven at a relatively high speed or under a relatively high load and the opening of the throttle valve 7 is therefore relatively large, the control valve 18 is correspondingly opened for smoothly passing, without resistance a relatively large amount of secondary air therethrough whereby the reed valve 17 which is alternately closed and opened by the pulsating flow of the exhaust gases passing through the auxiliary exhaust manifold means 14 can pass a relatively large amount of secondary air into the auxiliary exhaust manifold means 14.

Accordingly, the secondary air being supplied into the auxiliary exhaust manifold means 14 through the air supply passage means 19 varies in amount depending on the opening of the control valve 18 and the amount of secondary air being supplied during the low speed or low load operating condition of the engine E is drastically reduced in comparison with the conventional apparatus wherein a control valve is not provided in the secondary air supply passage means. In view of the above, the secondary air supply ratio can always be maintained at a proper value throughout all of the operating conditions of the engine E.

It is to be noted that, since the exhaust gases flowing through the main exhaust manifold means 11 are connected to the first group G1 of the engine cylinders 1, 2 and 3 through the collecting duct means 12, and the exhaust gases flowing through the auxiliary manifold means 14 are connected to the second group G2 of the engine cylinder 4 and the secondary air is supplied from the air cleaner 10 through the air supply passage means 19 to be mixed together at the junction of the auxiliary exhaust manifold means 14 to the manifold means 11, the secondary air supply ratio in the above construction should be determined such that the mixture of these gases and secondary air created at the junction and subsequently supplied into the three-way catalyst unit 16 is as a whole of the three-way atmosphere type. Therefore, the hydrocarbons and carbon monoxides contained in the exhaust gases as a whole can be reburned to provide a substantially purified exhaust gas which is subsequently discharged to the atmosphere. In other words, the exhaust gases emitted from the exhaust ports of the engine cylinders 1, 2 and 3 of the first group G1 are purified by passing through the reducing catalyst unit 15 to remove the nitrogen oxides in the absence of oxygen, that is, without the secondary air being mixed therewith. On the other hand, the exhaust gases emitted from the exhaust port of the engine cylinder 4 of the second group G2 joins together with the exhaust gases flowing from the reducing catalyst unit 15 and then flows through the three-way catalyst unit 16. Accordingly, within the catalyst unit 16, all of un-burned components, especially, hydrocarbons and carbon monoxides, which are contained in the exhaust gases and both emitted from the engine cylinders 1, 2 and 3 of the first group G1 and the engine cylinder 4 of the second group G2 are completely reburned by the assistance of the secondary air which is supplied from the air cleaner 10 through the secondary air supply passage means 19 and the auxiliary exhaust manifold means to thereby provide a substantially purified exhaust gas which is subsequently discharged to the atmosphere.

As is well known to those skilled in the art, the amount of the to-be-removed components of the exhaust gases, i.e., nitrogen oxides, hydrocarbons and carbon monoxides in the exhaust gases emitted from all of the engine cylinders depends upon the speed of the engine or the load on the engine and, therefore, the amount of the secondary air to be supplied from the air cleaner into the catalyst unit 16 is regulated by the control valve 18 of which opening is adjusted in accordance to the speed of the engine E or the load on the engine E.

Figure 3:
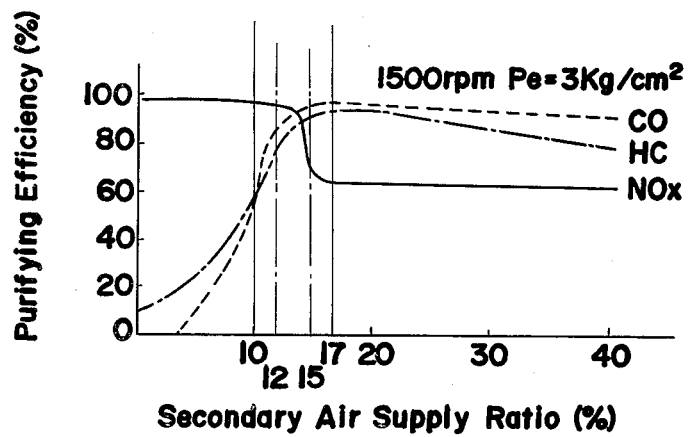
FIG. 3 is a graph illustrating the efficiency of the apparatus of the present invention and that of the prior art apparatus in removing NOx, CO and HC components of the exhaust gases.

The purifying efficiency of the exhaust gas purifying apparatus of the present invention wherein the control valve 18 is provided in the secondary air supply passage means 19 is shown in FIG. 3 in which a curve shown by the solid line represents variations in the amount of nitrogen monoxides, a curve shown by the broken line represents variations in the amount of carbon monoxides and a curve shown by the chain line represents variations in the amount of hydrocarbons, all of these curves being attained during a particular engine operating condition in which the number of revolution of the engine is 1,500 r.p.m., an average effective pressure is $P=3$ kg/cm$^2$ and the air-fuel mixture ratio is set to a value within the range of 13 to 14. This particular engine operating condition corresponds to city driving of a vehicle. From the graph of FIG. 3, it can readily be seen that, when the secondary air supply ratio is set at 10 to 17%, preferably, 12 to 15%, the catalyst contained in the catalyst unit 16 can exhibit a function as a three-way catalyst with the three-way atmosphere type with the respective amounts of the nitrogen monoxides, the carbon oxides and the hydrocarbons being simultaneously reduced at a relatively high rate. It is noted, however, that, where no control valve such as the one designated by 18 is employed in the secondary air supply passage means 19 such as in the conventional apparatus of a similar kind, since the secondary air supply ratio tends to become a value greater than 17%, the exhaust gases ready to pass through the catalyst unit 16 tend to be of an oxidizing atmosphere type and, therefore, the catalyst contained in the catalyst unit 16 cannot be used as a three-way catalyst.

As described above, according to the present invention, the absolute amount of the secondary air to be supplied into the exhaust passage provided with the three-way catalyst is regulated by the control valve which is operable to substantially adjust the cross sectional area of the secondary air supply passage means in a manner such that a relatively small amount of the secondary air is admitted into the auxiliary exhaust manifold means during the low speed or low load operating condition of the engine while a relatively large amount of the secondary air is admitted into the auxiliary exhaust manifold means during the high speed or high load operating condition of the engine.

Although the present invention has been fully described by way of example with reference to the accompanying drawings, it is noted that various changes and modifications may be apparent to those skilled in the art. Such changes and modifications are to be understood as being included within the true scope of the present invention unless they depart therefrom.

We claim:

1. An exhaust gas purifying apparatus for use in an automotive vehicle engine of a type which has a plurality of engine cylinders each having intake and outlet port means connected to a combustion chamber within the corresponding engine cylinder, the intake port means having an intake manifold connected thereto and the outlet port means of the respective engine cylinders being for exhausting exhaust gases to the outside of the engine subsequent to combustion of air-fuel mixtures which have been introduced into the associated combustion chambers of the engine cylinders through said intake port means, said exhaust gas purifying apparatus comprising:

a main exhaust passage means connected to specified ones of said outlet port means and having a reducing catalyst and a three-way catalyst disposed at the downstream side with respect to the reducing catalyst with respect to the direction of flow of the exhaust gases from the engine cylinders towards the outside of the engine;

an auxiliary exhaust passage means connected to a portion of said main exhaust passage means between said reducing catalyst and said three-way catalyst;

said outlet port means being divided into first and second groups, the outlet port means of the first group having said main exhaust passage means connected thereto and said outlet port means of the second group having said auxiliary exhaust passage means connected thereto, the number of said outlet port means of said first group being equal to or greater than half the total number of the engine cylinders;

a secondary air supply passage means having one end connected to said auxiliary exhaust passage means and the other end in in communication with a source of secondary air;

a pressure operated valve disposed in said secondary air supply passage means for allowing supplying a secondary air by utilizing a pulsating flow of the exhaust gases flowing through said auxiliary exhaust passage means; and a control valve disposed at the upstream side of said pressure operated valve on said secondary air supply passage means for regulating the rate of flow of the secondary air through said secondary air supply passage means in response to changes in the magnitude of the engine operating parameters.

2. An apparatus as claimed in claim 1, wherein the said control valve opening increases with a corresponding increase of the magnitude of the engine operating parameters.

3. An apparatus as claimed in claim 2, wherein said engine operating parameter is comprised of the speed of the engine.

4. An apparatus as claimed in claim 2, wherein said engine operating parameter is the load imposed on the engine.

5. An apparatus as claimed in claim 4, further comprising a throttle valve with said control valve being operatively coupled thereto, said throttle valve being located in the intake manifold connected to the intake port means such that, as the opening of said throttle valve increases, the opening of said control valve correspondingly increases.

6. An apparatus as claimed in claim 3, wherein said control valve is operatively coupled to a power output shaft of the engine such that, as the speed of the engine increases, the opening of the control valve correspondingly increases.

7. An apparatus as claimed in claim 3, wherein the opening of the control valve during the low speed of the engine or the low load engine operating condition is set to achieve a ratio of the amount of the secondary air to be supplied into the auxiliary exhaust passage means relative to the amount of the exhaust gases emitted which is within the range of 10 to 17%.

8. An apparatus as claimed in claim 1, wherein said automotive vehicle engine has four engine cylinders, the outlet port means of which are divided into first and second groups, the number of the exhaust ports of said first group being equal to or greater than the half the total number of the engine cylinders.

* * * * *